United States Patent [19]

Gruber

[11] Patent Number: 5,009,050
[45] Date of Patent: Apr. 23, 1991

[54] ROOFING CLAMP

[75] Inventor: Milan A. Gruber, Monaca, Pa.

[73] Assignee: Ed. Shook, Jr., Pittsburgh, Pa.

[21] Appl. No.: 511,753

[22] Filed: May 15, 1990

[51] Int. Cl.$^5$ .............................................. E04D 5/14
[52] U.S. Cl. ........................................ 52/408; 52/94; 160/402; 24/514
[58] Field of Search .............. 160/395, 394, 399, 402; 135/119, DIG. 5; 52/35, 63, 60, 61, 3, 94, 96, 222, 408, 410; 24/514, 569

[56] References Cited

U.S. PATENT DOCUMENTS 4,586,301  5/1986  Hickman ............................... 52/96
4,901,380  2/1990  Smith .................................... 52/35

Primary Examiner—John E. Murtagh
Attorney, Agent, or Firm—William J. Ruano

[57] ABSTRACT

A roofing clamp for attaching a flexible roofing sheet in a rain-tight manner. It comprises Z like halves which surround a block to clamp the roofing sheet therebetween. Machine screws hold the clamp halves together. The spacing between the clamp halves and block are of S shape at the ends to form a rain-tight seal devoid of perforation of the sheet.

3 Claims, 2 Drawing Sheets

ROOFING CLAMP

This invention relates to a roofing clamp for attaching a flexible roofing sheet to a roof in a rain-tight manner.

BACKGROUND OF THE INVENTION

Difficulty has been experienced in the past when attempting to attach a flexible sheeting of rubber or the like to a roof in a rain-tight manner, since such rain-tightness was difficult or sometimes impossible to achieve.

SUMMARY OF THE INVENTION

An object of the invention is to overcome the above-mentioned objections previously used roof fastening devices by providing a novel clamp having Z like halves which surround a block to clamp therebetween a portion of flexible roofing of rubber or similar material.

DESCRIPTION OF THE PREFERRED EMBODIMENT

Figure 1:
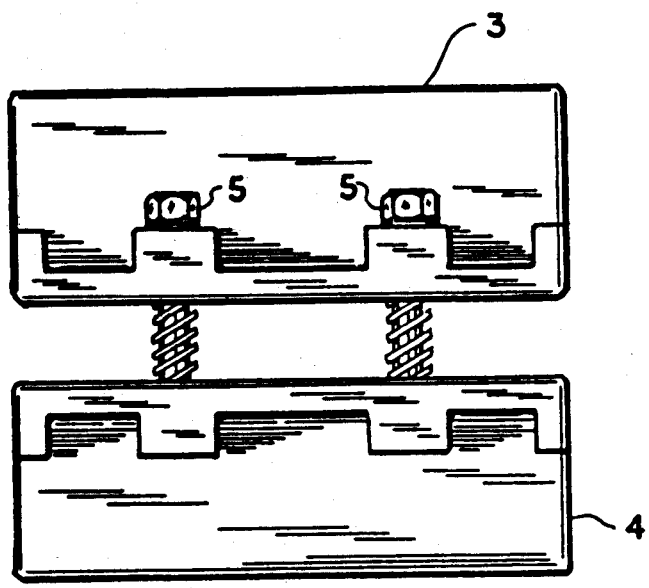
FIG. 1 is a top view.
Figure 3:
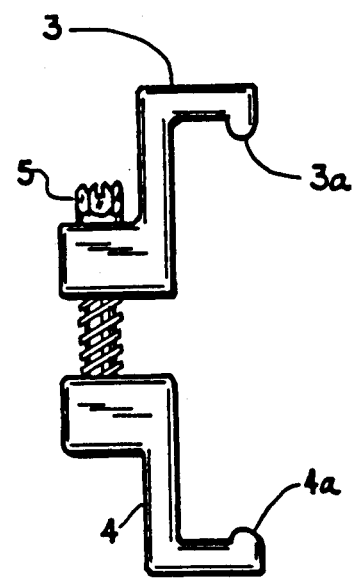
FIG. 3 is an end view of a clamp portion of the present invention.
Figure 2:
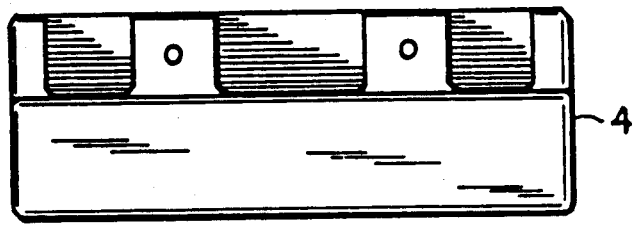
FIG. 2 is a side view.
Figure 4:
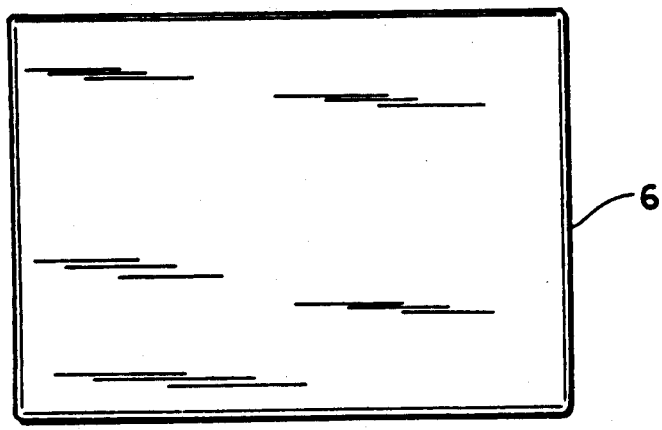
FIG. 4 is a top view.
Figure 6:
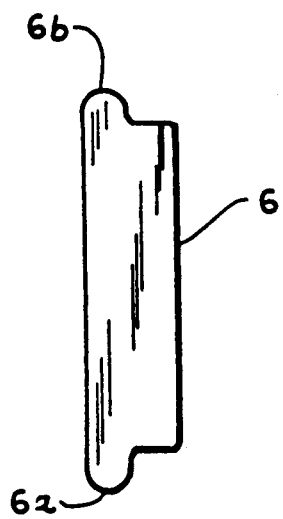
FIG. 6 is an end view of the other clamp portion which is to be surrounded by the clamp portion of FIG. 1, 2 and 3.
Figure 5:
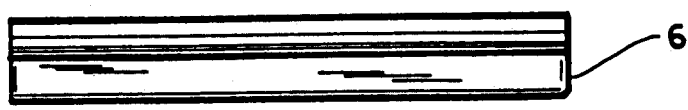
FIG. 5 is a side view.

Referring to FIGS. 1, 2 and 3, numerals 3 and 4 denote two clamping halves Z-like shape, each having three legs at right angles to each other with inwardly extending projections 3a and 4a at the extremity of one of the legs. Numerals 5, 5 denote a pair of machine screws or bolts for attaching the abovementioned halves together after block 6 of FIGS. 4, 5 and 6 is inserted between the clamp halves shown in FIGS. 1–3, as more clearly shown in FIGS. 7 and 8.

Figure 7:
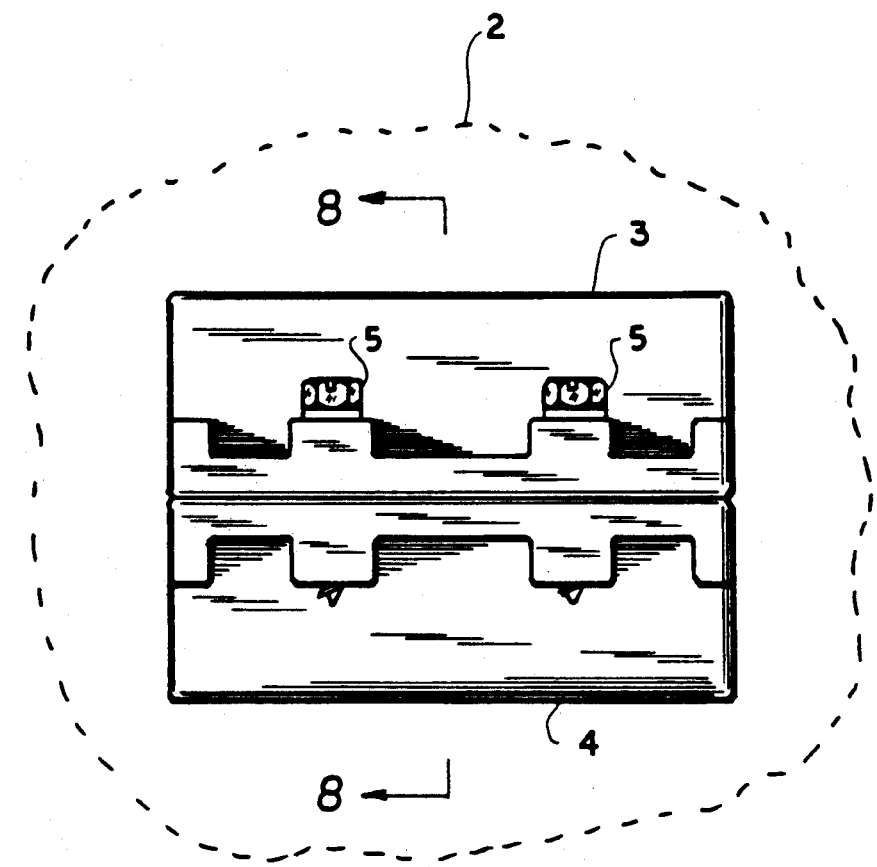
FIG. 7 is a side view of and FIG. 8 is a cross-sectional view taken along line 8—8 of FIG. 7 showing both clamp halves of FIGS. 1–6 combined to clamp therebetween a part of flexible roofing material is a rain-tight manner.
Figure 8:
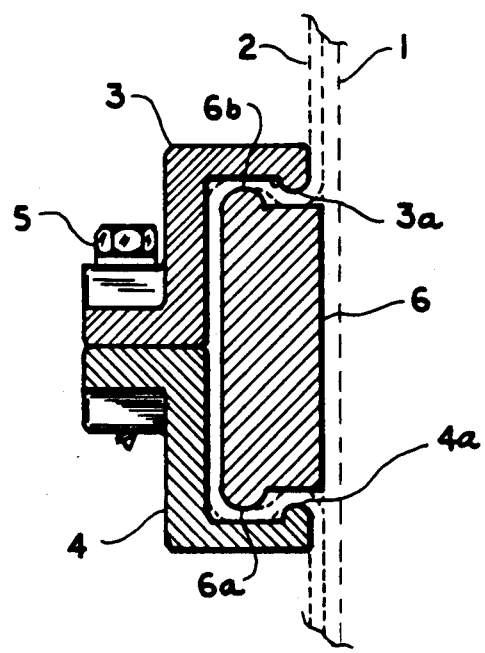

FIG. 7 and 8 show the manner that a portion of the flexible roofing 2 is passed through the space between the clamp halves and block 6 after block is fastened to a roof portion 1, both shown in dotted lines. Important features of the clamp are in inward projections 3a, 6b and 4a, 6b between which a portion of the flexible sheet 2 is passed in an S-shaped path to tightly grasp the flexible sheet 2.

Clamp halves 3 and 4 and block 6 are preferably made of plastic material.

By virtue of the above-described construction, even if rain should leak the legs clamped by screws 5 since the leakage would remain exterior to the roofing sheet 2.

A plurality of connections as shown in FIG. 8 may be made along the perimeter of the roof or on any portion of the roof wherein clamping of the sheet 2 is desired.

While I have illustrated and described a single specific embodiment of my invention, it will be understood that this is by way of illustration only and that various changes and modifications may be contemplated in my invention within the scope of the following claims.

I claim:

1. In combination with an impervious flexible roofing sheet, a clamp for clamping said sheet to a roof in a rain-tight manner, comprising a pair of Z-like clamp halves, each having three legs att right angles to each other, one of the ends of each leg having an inward extending, substantially semicircular projection, a rectangular block attached to the roof and having a pair of outward extending, substantially semi-circular projections outwardly of said roof, machine screws for detachably fastening the other of said three legs in abutting relationship and in spaced surrounding relationship to said rectangular block sufficiently to accommodate a portion of said flexible roofing sheet in surrounding relationship to the exposed surface of said rectangular block so that each of said block form an S-like path to said portion of said roof sheet, the spacing between the outer surface of said block and the inner surface of said clamp halves being substantially that of the thickness of said flexible roofing sheet throughout the entire inner surface of said clamp halves and the entire outer surface of said rectangular block.

2. The combination recited in claim 1 wherein said roofing material is rubber.

3. The combination recited in claim 1 wherein said clamp and rectangular block are of rigid plastic material.

* * * * *